United States Patent [19]

Balcerski et al.

[11] Patent Number: 5,558,741
[45] Date of Patent: Sep. 24, 1996

[54] METHOD FOR MAKING A WEATHERSTRIP

[75] Inventors: Bruce D. Balcerski, Lexington; James H. Tucker, Port Huron, both of Mich.

[73] Assignee: Acheson Industries, Inc., Port Huron, Mich.

[21] Appl. No.: 267,865

[22] Filed: Jun. 28, 1994

[51] Int. Cl.$^6$ .................................................. B60J 10/00
[52] U.S. Cl. .................................... 156/244.11; 49/475.1; 156/272.2; 292/DIG. 70; 296/93
[58] Field of Search ........................... 428/31; 49/475.1; 156/244.11, 272.2; 292/DIG. 70; 296/93

[56] References Cited

U.S. PATENT DOCUMENTS

| | | | |
|---|---|---|---|
| 3,819,464 | 6/1974 | Ungerer | 49/489.1 |
| 4,319,942 | 3/1982 | Brenner | 428/90 X |
| 4,483,951 | 11/1984 | Brenner | 524/82 |
| 4,975,306 | 12/1990 | Jackson | 428/31 |
| 5,042,201 | 8/1991 | Vaughn | 49/482.1 |
| 5,093,181 | 3/1992 | Sanchez | 428/167 |
| 5,110,685 | 5/1992 | Cross et al. | 428/494 |
| 5,115,007 | 5/1992 | Chihara et al. | 428/424.2 X |
| 5,151,307 | 9/1992 | Jackson | 428/31 |

*Primary Examiner*—Henry F. Epstein
*Attorney, Agent, or Firm*—Dinnin & Dunn, P.C.

[57] ABSTRACT

A method of making a weatherstripping product for attachment on an automotive vehicle or for other weatherstripping applications, said method comprising the steps of: forming a support member of a predetermined configuration, extruding an elastomeric weatherstrip, treating a surface of the elastomeric weatherstrip with an abundance of ultraviolet radiation from a UV source to thereby provide a UV treated surface on the weatherstrip, applying a low friction surface coating to the UV treated surface on the weatherstrip to provide a coated elastomeric weatherstrip, mounting the coated elastomeric weatherstrip on said support member, to thereby provide a weatherstripping product with markedly improved anti-squeak and ice release characteristics; and the weatherstripping product prepared from this material.

7 Claims, 1 Drawing Sheet

U.S. Patent  Sep. 24, 1996  5,558,741
Fig. 1.
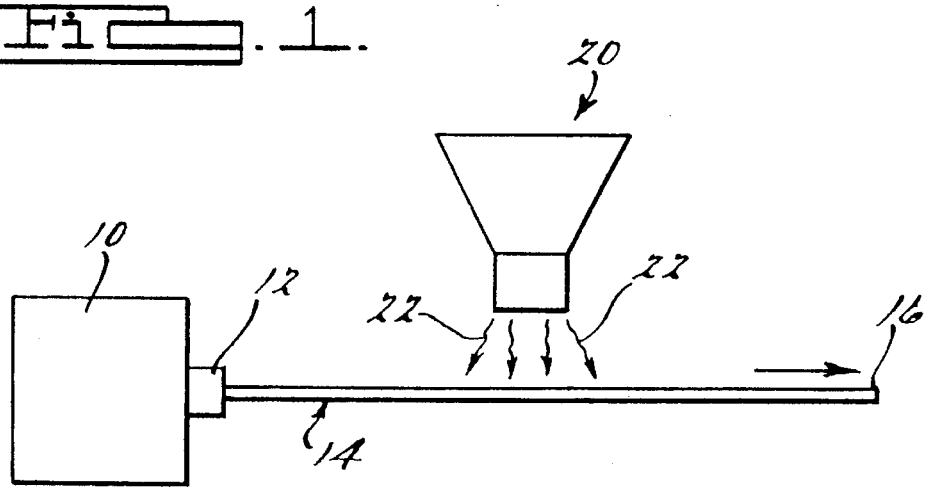
Fig. 2.
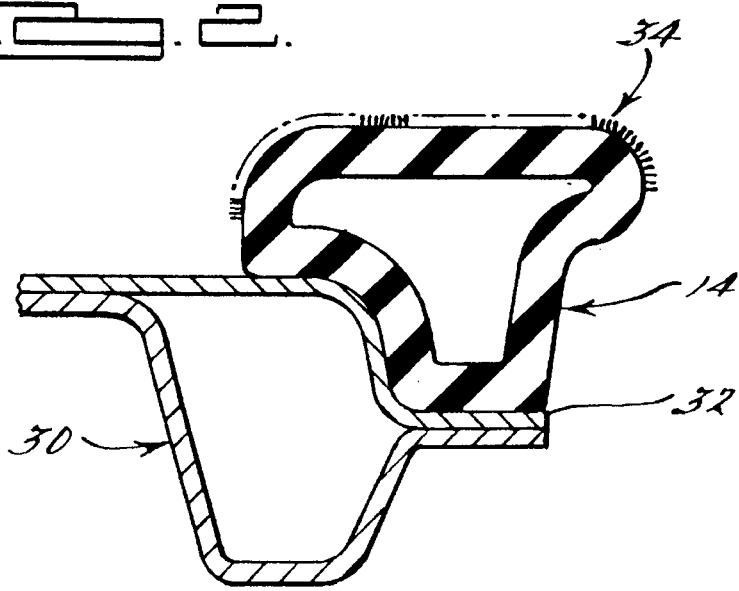
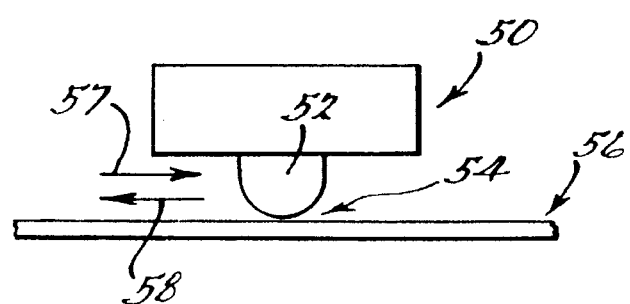
Fig. 3.

યુ5,558,741

METHOD FOR MAKING A WEATHERSTRIP

BACKGROUND OF THE INVENTION

This invention relates to a new weatherstrip product for automotive vehicles and for other weatherstripping applications and to a novel method of making the weatherstrip product. More particularly, this invention relates to a novel weatherstrip product which includes a low friction surface coating thereon, which is economical to produce, and which possesses markedly improved anti-squeak and ice release properties.

In the past there have been significant problems associated with the usage of weatherstripping products in the automotive vehicle field due to poor performance characteristics in the areas of ice release and/or anti-squeak conditions. Problems in the area of ice release occur under extreme cold or winter usage conditions for the weatherstripping product wherein the weatherstrip is applied between a support member of the vehicle and another moving frame or flange member of the vehicle, such that when the flange member is repeatedly moved or opened relative to the stationary positioned weatherstrip, the ice formation between the two causes peeling, breaking, or fracture of the weatherstrip product relative to its support member or relative to the weatherstrip itself. Numerous attempts have been made to solve these ice release problems in the past, however, earlier attempted solutions have not been successful. The anti-squeak characteristics of a weatherstrip product are important in those applications, for example, where the weatherstrip is positioned between a stationary support member and another flange or frame member, or glass member, with this secondary member being either of the stationary type or of a type which is moved relative to the support member which holds the weatherstrip. Under such conditions and during normal vehicle flexing conditions there are often times created a situation wherein the usage of previous weatherstrip products caused a noticeable squeaking sound, which is of course detrimental or offensive to persons using the vehicle. Past attempts to solve such squeaking characteristics associated with the usage of weatherstrip products have either not been successful or have been very uneconomical to put into effect.

Accordingly it is primary object of this invention to provide a new and improved weatherstripping product which is economical to produce and which acts to overcome the problems noted above.

Another object of the present of the invention is to provide a new and improved weatherstrip product and a novel method of making same.

Another object of the invention is to provide a new weatherstrip product which includes a surface coating thereon which exhibits markedly improved adhesion properties without the usage of VOC ladened primers (e.g. primers containing trichloroethane, etc.).

Another object of the present invention is to provide a new weatherstrip product which is economical to produce and which does not require the usage of any primer coatings prior to the application of a low friction coating thereon, which weatherstrip product possesses markedly improved ice release characteristics.

Another object of the present invention is to provide a new weatherstrip product and economical method of producing same which possesses excellent adhesion properties and anti-squeak properties.

Other objects, features, and advantages of the present invention will become apparent from the subsequent description and the appended claims.

BRIEF DESCRIPTION OF THE DRAWINGS

FIG. 1 illustrates in schematic form an extruder apparatus from which an elastomeric weatherstrip is extruded and then passed through an ultraviolet radiation treatment zone which provides a UV treatment on one or more surface areas of the weatherstrip;

FIG. 2 illustrates, in cross-section, a weatherstrip product in accordance with the invention mounted in position on a flange or support member (such as a door frame, window frame, trunk frame, or the like) of an automotive vehicle, and FIG. 3 illustrates an abrasion test unit for evaluating the abrasion resistance of a weatherstrip product.

SUMMARY OF THE INVENTION

From a method aspect, briefly stated, the present invention involves a method of making a weatherstripping product for attachment on an automotive vehicle or for other weatherstripping applications, said method comprising the steps of: forming a support member to a predetermined configuration, extruding an elastomeric weatherstrip, treating a surface of the elastomeric weatherstrip with an abundance of ultraviolet radiation from a UV source to thereby provide a UV treated surface on the weatherstrip, applying a low friction surface coating to the UV treated surface on the weatherstrip to provide a coated elastomeric weatherstrip, mounting the coated elastomeric weatherstrip on said support member, to thereby provide a weatherstripping product with markedly improved anti-squeak an ice release characteristics.

From a product aspect, briefly stated, the present invention involves a weatherstrip product means for use on automotive vehicles or for other applications to enable a weatherstripping seal between two surfaces, said product comprising, an extruded elastomeric weatherstrip, a UV treated surface on said extruded weatherstrip, said surface being formed by treating said surface with an abundance of ultraviolet radiation, a low friction surface coating directly on the UV treated surface, without the presence of any primer coating, to thereby provide a weatherstrip product with markedly improved anti-squeak and ice release characteristics. It is important to note that these properties are obtained in this invention in that the surface coating has been found to exhibit excellent adhesion to the elastomeric substrate. While the theory and reasons as to why the invention provides such good results is not fully understood, it is believed that the UV exposure plays a significant role in providing these benefits.

DESCRIPTION OF THE BEST MODE AND PREFERRED EMBODIMENTS OF THE INVENTION

FIG. 1 illustrates an extrusion apparatus 10 in schematic form, which has an extruder head 12 and also illustrates the extruded weatherstrip 14 being extruded and passing therefrom in a direction to the right as shown by the arrow 16. Positioned above the elastomeric weatherstrip 14 is an ultraviolet radiation source designated 20 with the ultraviolet radiation being directed therefrom as shown by the arrows 22 on to one or more surface areas of the weatherstrip 14. It is to be understood that more than one ultraviolet light source such as 20 can be used such that different selected areas of the weatherstrip product can be subjected to the UV treatment ("UV" as used herein stands for ultraviolet).

FIG. 2 illustrates in cross-sectional view, a frame member designated 30 on an automotive vehicle or the like with the frame member also having flange portion 32 on which the weatherstrip 14 is fixedly secured either with various types of fastening means, adhesive, or the like, which are typical methods for securing the weatherstrip to a flange member or frame member of the automotive vehicle. It should be understood that the elastomeric weatherstrip 14 can be of any suitable shape or cross-section dependent upon the particular application or usage for which the weatherstrip product is being utilized. In the particular embodiment shown in FIG. 2 it is to be noted that the surface which has been treated with ultraviolet radiation is designated by the dotted line 34.

The weatherstrip in accordance with this invention should be generally elastomeric in nature such that it will have the resiliency and cushioning effect as is normally required for weatherstripping applications. In addition the elastomeric material in accordance with this invention is a material selected from at least one elastomeric material in the group consisting of an EPDM elastomer, a chloroprene elastomer, a polyisoprene elastomer, a vinyl, butyl rubber, nitrile rubber, natural rubber, or butadiene rubber. Alternatively stated, the elastomeric material may be selected from at least one of the group consisting of: copolymers of ethylene, propylene and butadiene (i.e. EPDM); vinyl polymers; neoprene, butylene, isoprene, acrylonitrile, butadiene, and natural rubber. Moreover, vinyl chloride polymers and adducts of same with the above should also be considered within the scope of this invention.

FIG. 3 illustrates and abrasion testing unit which is sometimes referred to as a Gardco wear-friction tester model D10-V-F1. The configuration of the apparatus is such that a 3 kg weight designated 50 is placed on a piece of ground glass designated 52 (which is sanded with 400 grit paper). The ground glass member 52 travels back and forth (as indicated by the arrows 57, 58) over the rubber material being tested which is designated 56 in a back and forth repetitive fashion at a typical speed of 3100 inches per minute. The drawing illustration in FIG. 3 is modeled to meet Toyota Specification No. TSM-1708-G.

In accordance with the invention one or more selected surface areas of the elastomeric weatherstrip are treated with an abundance of ultraviolet radiation from a UV source to thereby provide a UV treated surface on the weatherstrip.

The time of application for the UV radiation to the weatherstrip surface is, broadly stated, within the range of about 1/10th second to about 60 seconds. Preferably it should be within the range of about ½ second to about 20 seconds; and, best results are obtained when the time of treatment with the UV radiation source falls within the range of about 1 to about 10 seconds.

The dose intensity of the UV radiation applied to the weatherstrip should, broadly stated, be within the range of about 0.2 to about 40 Joules. Preferably it should be within the range of about 1 to about 15 Joules, and best results are obtained when the dose intensity is within the range of about 2 to about 12 Joules. The preferred UV light source is a medium intensity UV lamp source, for example such as is commercially available from Tecknocure Systems Co.

The distance of the UV light source from the weatherstrip, during application of the UV treatment, should broadly be within the range of about ¼ inch to about 24 inches, and preferably it should be within the range of about ¼ inch to about 12 inches; and most suitably at about 3 to 8 inches.

The low friction surface coating which is applied to the UV treated surface on the weatherstrip should preferably be a low friction surface coating which is comprised of at least one resin binder material and at least one lubricant material. The lubricant material is preferably a fluorocarbon polymer material (such as PTFE), or a silicone lubricant material. Suitable coatings of this type which are useable in the invention are available from Acheson Industries, Inc. (Port Huron, Mich.), and are designated as EMRALON® coating products: No. 8327, No. 8302-02, No. 8302-01, No. 329, No. 393, and No. 394. Preferred results have been obtained with EMRALON 8327, EMRALON 8302-02, and EMRALON 8302-01. These surface coatings can be applied to the weatherstrip through a number of different techniques, such as by spray coating, by roller coating, by dip coating, or by brush coating. Preferably the coating should be applied within a few seconds to four weeks after the UV treatment, although longer time periods are not to be excluded The thickness of the applied coating should be, broadly stated, within the range of about 0.1 to about 20 mils. Preferably it should be within the range of about ½ to about 6 mils; and most suitably within the range of about 1 to about 3 mils. (1 mil equals 0.001 inch).

The mounting of the coated weatherstrip on the support member is carried out or effected by fastening the elongated weatherstrip to the frame or support member through the use of mechanical fastening means, by adhesive means, and/or by any other suitable technique commonly used to fasten the elongated weatherstrip into position on its frame or support within the vehicle. It is also to be understood in accordance with the invention that the novel weatherstripping product described herein can be used in other applications, aside from automotive vehicles, for example in household weatherstripping requirements, other industrial weatherstripping requirements or the like.

Test Results & Examples

As shown in series 1–4, applicant has tested, in addition to EPDM, seven rubbers, and the results are shown in the accompanying Table 1. As evidenced from these examples, abrasion resistance (3 kg abrasion), toluene rub resistance (toluene), and knife adhesion (knife) are greatly improved when the rubber or elastomeric weatherstrip is first exposed to approximately 3 Joules of radiation (series 2) versus no radiation (series 1). Over-exposure may occur in some instances (series 3), and this results in poor adhesion, knife, and toluene resistance. For comparison, series 4 compares one of the better primers (as required and used in the prior art); the indifferent or spotty behavior of this material is clearly apparent. Lack of wide spectrum adhesion is typical of primers used in the prior art.

Applicant's low friction coatings interest is in several areas. 1. Ice release—rubber or PVC moldings for hoods, deck-lids, and doors. 2. Anti-squeak coatings—where squeak properties of a newly formed junction (i.e. rubber to paint or glass) are severe and need a low stick-slip tendency. 3. Appearance coatings—which are critical to areas where the techniques of this invention provides excellent properties and characteristics. 4. High abrasion resistance—where the wear properties of the coating are severe and the coating is very resistant to abrasion (and yet the coating itself will not abrade away the adjacent surface paint).

The prior art primers present numerous problems which center around the fact that they are almost always solvent-based and thus usually cause significant problems with adhesion; and these prior primer coatings are detrimental due to their ozone depleting consequences caused by solvents in those primers. Whereas, this invention produces excellent characteristics because adhesion is wide spectrum, simple, convenient, line friendly and produces no VOCs (volatile organic compounds).

Additional Information Applicant's abrasion unit is a Gardco Wear-Friction tester Model D10VF1. The configuration of the apparatus is such that a 3 kg weight is placed on a piece of ground glass (sanded with 400 grit paper) traveling over the rubber in a back and forth repetitive fashion at a speed of 3100 inches per minute. A drawing is shown in FIG. 3, and is modeled to meet Toyota TSM1708G specification.

The toluene rub test is done by wiping a solvent-soaked rag with "moderate" pressure (generally about 5 psi force) over the substrate in a repeated fashion until the coating has been worn through. This test is standard in the paint industry.

The knife test is subjective and is used as a preliminary test. Essentially, the test consists of slicing through the coating into the rubber with a knife and subsequently trying to peel the coating away from the substrate. Ratings again are subjective but based on prior history.

appearance, flexible, excellent in wear resistance and not abrasive to painted surfaces.

EMRALON 8302-01 is a water-based resin bonded fluoro-polymer coating designed to be applied to rubber as it is being extruded or after extrusion. EMRALON 8302-01 cures in approximately 30 seconds when applied to 400° F. rubber; and, in one minute when applied to 250° F. rubber. The flat black, cured coating is flexible, has excellent wear resistance, and is not abrasive to painted surfaces.

EMRALON 8302-02 is a water-based resin bonded fluoro-polymer coating designed to be applied on to hot rubber as it is being extruded or shortly after it is extruded. EMRALON 8302-02 cures in approximately 30 seconds when applied on to 400° F. rubber; and, in approximately one minute when applied on to 250° F. rubber. The medium gloss, black, cured coating is flexible, has excellent wear resistance, and is not abrasive to painted surfaces.

EMRALON 328 and EMRALON 329 are fast drying, resin bonded, fluorocarbon dry film lubricants capable of coating rubber or elastomeric materials. EMRALON 328 and EMRALON 329 cure at room temperature, allowing applications where conventional sintered PTFE coatings cannot be considered. The coefficient of friction when the coatings are properly applied, range from 0.06 to 0.09. A coating thickness of 0.0002 through 0.0007 inches generally provides the optimum low friction properties. The binder for

TABLE 1

| TYPE<br>TDRF<br>304-D-31475 | CR<br>Neoprene ®<br>polychloro-<br>prene | IIR<br>Butyl<br>isobutylene<br>isoprene | NATSYN ®<br>Natsyn<br>synthetic<br>polyisoprene | NBR<br>Nitrile<br>acrylonitrile<br>butadiene | NR<br>Natural<br>polyisoprne | PBD<br>Poly-<br>butadiene | SBR<br>Styrene<br>Butadiene |
|---|---|---|---|---|---|---|---|
| "A" Dose 0 = 0 Joules | | | | | | | |
| Knife | Poor | Poor | Poor | Poor | Fair | Poor | Fair |
| Toluene | 41 | 7 | 36 | 52 | 83 | 22 | 23 |
| 3 Kg Abrasion | 8,000 | 2,000 | 2,500 | 6,000 | 4,000 | 1,000 | 2,000 |
| Failure Mode | Adhesion | Adhesion | Adhesion | Adhesion | Adhesion | Adhesion | Adhesion |
| "B" Dose 1 = 3.0 Joules | | | | | | | |
| Knife | Poor | Poor | Fair | Poor | Fair | Fair | Good |
| Toluene | >100 | >100 | >100 | >100 | >100 | 67 | >100 |
| 3 Kg Abrasion | >40,000 | 7,000 | >40,000 | 7,500 | >40,000 | 3,000 | 4,500 |
| Failure Mode | None | Adhesion | None | Adhesion | None | Adhesion | Coating |
| "C" Dose 2 = 10.8 Joules | | | | | | | |
| Knife | Fair | Fair | Fair | Fair | Fair | Fair | Excellent |
| Toluene | 63 | 53 | 26 | 26 | 22 | >100 | >100 |
| 3 Kg Abrasion | 17,500 | 8,500 | 11,000 | 11,000 | 11,000 | 7,000 | 2,000 |
| Failure Mode | Coating | Adhesion | Coating | Coating | Coating | Coating | Adhesion |
| "D" Dose EM 8322 | | | | | | | |
| Knife | Poor | Fair | Fair | Fair | Good | Fair | Good |
| Toluene | >100 | 63 | 38 | >100 | 35 | >100 | >100 |
| 3 Kg Abrasion | 6,000 | 20,000 | 4,000 | 5,000 | 10,000 | 1,000 | 2,000 |
| Failure Mode | Adhesion | Adhesion | Adhesion | Adhesion | Adhesion | Adhesion | Adhesion |

Topcoat EMRALON 8327 Cured 10' at 150 C. (applied at a thickness of about 1 mil)
Abrasion failure = 50% coating removal
Distance from the UV lamp - approx. 4–5 inches.
Time of exposure - approx. 3–5 seconds.
Lamp setting - 200 watts.
Samples exposed to 10.8 Joules of irradiation showed signs of reversion The low friction surface coatings which are useable in the invention may be described as follows: EMRALON 8327 is a water-based resin bonded fluorocarbon polymer coating designed to be applied to hot rubber as it is being extruded or after extrusion. This coating cures in one minute when applied at 400° F. and the cured coating is flat black in the EMRALON 328 and 329 coatings is a thermoplastic resin.

The low friction surface coatings in accordance with this invention can be applied by conventional spray, dip, or brushing techniques. For heavier coats it is better to make multiple light passes than to apply a single heavy coat, and also allowing a few minutes for drying between passes. Electrostatic spray methods may also be used.

The EMRALON 8327 coating, the EMRALON 8302-01 coating and the EMRALON 8302-02 coating utilize thermosetting resin binders.

The unique features and technical advantages of the invention are as follows. In the past it has been necessary to use primer coatings on the extruded weatherstrip (or gasket) before a suitably adherent surface coating could be applied thereto. With the present invention it has been discovered that a much more economical manufacturing process is possible because the requirement of a primer coat application is no longer required. In addition the finished weatherstrip product has been discovered to possess excellent ice release properties and anti-squeak properties without the presence of any primer coating; and this appears to be the result of the excellent adhesion characteristics of the surface coating applied to the weatherstrip in this invention. Still further weatherstrip products made with appearance coatings in accordance with this invention perform extremely well and are very economical to produce. Moreover, the products made in accordance with this invention are able to provide markedly improved properties and characteristics in accordance with the knife test, the toluene test, and the abrasion test described herein.

While it will be apparent that the preferred embodiments of the invention disclosed are calculated to fulfill objects, benefits and/or advantages of the invention, it will be appreciated that the invention is susceptible to modification variation and change without departing from the proper scope or fair meaning of the subjoined claims.

What is claimed is:

1. A method of making a weatherstripping product for attachment on an automotive vehicle or for other weatherstripping applications, said method comprising the steps of:

forming a support flange member to a predetermined configuration, extruding an elastomeric weatherstrip, treating a surface of the elastomeric weatherstrip with an abundance of ultraviolet radiation from a UV source to thereby provide a UV treated surface on the weatherstrip,
      said ultraviolet radiation is applied from a UV source having an intensity within the range of about 0.2 to about 40 Joules, and
      said ultraviolet radiation is applied for a time period of about ½ to about 60 seconds, applying a low friction surface coating to the UV treated surface on the weatherstrip to provide a coated elastomeric weatherstrip, mounting the coated elastomeric weatherstrip on said support member, to thereby provide a weatherstripping product with markedly improved abrasion resistance, anti-squeak and ice release characteristics.

2. The method of claim 1 wherein,
   said elastomeric weatherstrip is material selected from at least one elastomeric material from the group consisting of EPDM elastomer, neoprene elastomer, polyisoprene elastomer, vinyl chloride elastomer, butyl rubber, nitrile rubber, natural rubber and butadiene rubber.

3. The method of claim 1 wherein, said low friction surface coating is comprised of a resin binder material and a lubricant pigment material.

4. A method of making a weatherstripping product for use on automotive vehicles or for other weatherstripping applications, said method comprising the steps of:

extruding an elastomeric weatherstrip, treating a surface of the elastomeric weatherstrip with an abundance of ultraviolet radiation from a UV source to thereby provide a UV treated surface on the weatherstrip,
      said ultraviolet radiation is applied from a UV source having an intensity within the range of about 0.2 to about 40 Joules, and
      said ultraviolet radiation is applied for a time period of about ½ to about 60 seconds, applying a low friction surface coating to the UV treated surface on the weatherstrip to provide a coated elastomeric weatherstrip, to thereby provide a weatherstripping product with improved abrasion resistance, anti-squeak, and ice release characteristics.

5. The method of claim 4 wherein,
   said elastomeric weatherstrip is a material selected from at least one elastomeric material from the group consisting of EPDM elastomer, neoprene elastomer, polyisoprene elastomer, polyvinyl chloride elastomer, butyl rubber, nitrile rubber, natural rubber and butadiene rubber.

6. The method of claim 4 wherein,
   said low friction surface coating is comprised of a resin binder material and a lubricant pigment material.

7. A method of making a weatherstripping product for attachment on an automotive vehicle or for other weatherstripping applications, said method comprising the steps of:

forming a support flange member to a predetermined configuration, extruding an elastomeric weatherstrip,
      said elastomeric weatherstrip is a material selected from at least one elastomeric material from the group consisting of EPDM elastomer, neoprene elastomer, polyisoprene elastomer, vinyl chloride elastomer, butyl rubber, nitrile rubber, natural rubber and butadiene rubber, treating a surface of the elastomeric weatherstrip with an abundance of ultraviolet radiation from a UV source to thereby provide a UV treated surface on the weatherstrip,
      said ultraviolet radiation is applied from a UV source having an intensity within the range of about 0.2 to about 40 Joules, and
      said ultraviolet radiation is applied for a time period of about ½ to about 60 seconds, applying a low friction surface coating to the UV treated surface on the weatherstrip to provide a coated elastomeric weatherstrip, mounting the coated elastomeric weatherstrip on said support member, to thereby provide a weatherstripping product with markedly improved anti-squeak and ice release characteristics.

* * * * *

UNITED STATES PATENT AND TRADEMARK OFFICE
CERTIFICATE OF CORRECTION

PATENT NO.    : 5,558,741
DATED         : September 24, 1996
INVENTOR(S)   : Bruce D. Balcerski and James H. Tucker It is certified that error appears in the above-indentified patent and that said Letters Patent is hereby corrected as shown below:

Column 1, Line 50, after "present" delete "of the".

Column 2, Line 35, delete "an", insert -- and --.

Column 3, Line 35, delete "and", insert -- an --.

Column 6, Line 3, in TABLE 1, the sixth column: "polyisprne" should read -- polyisprene --.

Signed and Sealed this

Twenty-second Day of April, 1997

Attest:

BRUCE LEHMAN

Attesting Officer

Commissioner of Patents and Trademarks